United States Patent
Koh

(10) Patent No.: US 8,835,043 B2
(45) Date of Patent: Sep. 16, 2014

(54) BATTERY PACK

(75) Inventor: Seok Koh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 100 days.

(21) Appl. No.: 13/219,091

(22) Filed: Aug. 26, 2011

(65) Prior Publication Data

US 2012/0208046 A1    Aug. 16, 2012

(30) Foreign Application Priority Data

Feb. 10, 2011    (KR) .................. 10-2011-0011869

(51) Int. Cl.
*H01M 2/02*    (2006.01)

(52) U.S. Cl.
CPC .................. *H01M 2/0212* (2013.01)
USPC .............................................. 429/163; 429/7

(58) Field of Classification Search
CPC .. H01M 2/021; H01M 2/0212; H01M 10/425
USPC ..................................................... 429/7, 163
See application file for complete search history.

(56) References Cited

U.S. PATENT DOCUMENTS

| 5,298,347 A | 3/1994 | Aksoy et al. |
| 7,887,949 B2 | 2/2011 | Yoon |
| 7,910,243 B2 | 3/2011 | Koh et al. |
| 2009/0111018 A1 | 4/2009 | Park et al. |

FOREIGN PATENT DOCUMENTS

| JP | 2007073203 | 3/2007 |
| KR | 10-2007-0102149 | 10/2007 |
| KR | 10-2008-0058965 | 6/2008 |
| KR | 2009004393917 A | 5/2009 |

OTHER PUBLICATIONS

Korean Office Action issued by KIPO on Jul. 20, 2012 in connection with Korean Patent Application No. 10-2011-0011869 and Request for Entry attached herewith.

Korean Notice of Allowance issued on Dec. 30, 2013 in connection with Korean Patent Application No. 10-2013-0050131 which also claims Korean Patent Application No. 2011-0011869 as its priority document and Request for Entry of the Accompanying Office Action attached herewith.

*Primary Examiner* — Nicholas P D'Aniello
(74) *Attorney, Agent, or Firm* — Robert E. Bushnell, Esq.

(57) ABSTRACT

A battery pack having a cover frame configured to be tightly coupled to the four side surfaces of a bare cell. The cover frame includes a rectangular cell receiving part framed by four frame parts, wherein each of the four frame parts include a support section for supporting the lower case of the bare cell, and three of the frame parts include ribs supporting the upper case of the bare cell, wherein a fourth one of the frame parts includes tab receiving grooves supporting the electrode tabs extending from the bare cell. The cover frame further includes a protection circuit module receiving part adjacent to, and separated from the cell receiving part by the fourth one of the frame parts.

14 Claims, 7 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on the 10 Feb. 2011 and there duly assigned Serial No. 10-2011-0011869.

BACKGROUND OF THE INVENTION

1. Field of the Invention

Embodiments of the present invention relate to a battery pack.

2. Description of the Related Art

In general, a battery pack includes a bare cell having an electrode assembly housed in a case, and a cover frame surrounding edges of side surfaces of the bare cell. The cover frame is required to be tightly coupled to the side surfaces of the bare cell and easily formable to be manufactured in high yield.

SUMMARY OF THE INVENTION

Embodiments of the present invention provide a battery pack having a cover frame configured to be tightly coupled to side surfaces of a bare cell and easily formable to be manufactured in high yield.

According to an embodiment of the present invention, a battery pack is provided, including a bare cell, and a cover frame formed to surround top, bottom and opposing side surfaces of the bare cell, wherein the cover frame includes a rib formed only at lengthwise portions corresponding to opposing short side surfaces of the bare cell, and the rib protrude inwardly with respect to the cover frame.

The rib may be formed at one end of the cover frame in a thickness direction, and a support portion may be formed at the other end of the cover frame in the thickness direction to protrude inwardly with respect to the cover frame.

The support portion may be formed at a region other than a region where the rib is formed.

The rib may cover a portion of a top surface of the bare cell, and the support portion may cover a portion of a bottom surface of the bare cell.

The cover frame may include a first frame surrounding the top surface of the bare cell, a second frame surrounding the bottom surface of the bare cell and formed to face the first frame, and third and fourth frames surrounding short side surfaces of the bare cell and connecting one and the other ends of the first and second frames, respectively.

The ribs may be formed in the third frame and the fourth frame and may be located at the distance from the first frame and the second frame.

The battery pack may further include a rib formed in the second frame.

The rib formed in the second frame may be located at the same distance from the one and the other ends of the second frame.

One and the other ends of the support portion formed in the second frame may be connected to one ends of the support portions formed in the third and fourth frames, respectively.

The ribs may be formed in the third frame and the fourth frame and may be located to be opposite to each other in view of the location of the distance from the first frame and the second frame.

The battery pack may further include a rib formed in the second frame.

The rib formed in the second frame may be located at the same distance from the one and the other ends of the second frame.

One and the other ends of the support portion formed in the second frame may be connected to one ends of the support portions formed in the third and fourth frames, respectively.

The cover frame may be made of an elastic material.

In the battery pack according to the present invention, the cover frame can be easily formed, thereby reducing the molding cost and improving the yield.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, embodiments of the present invention will be described in detail with reference to the accompanying drawings.

Figure 1:
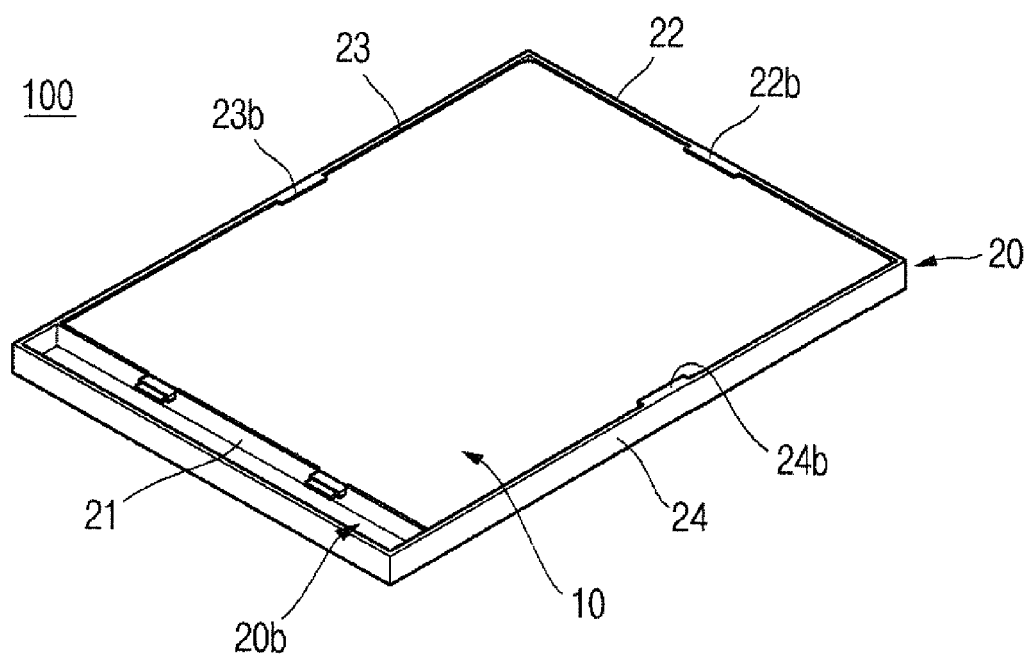
FIG. 1 is a perspective view of a completed battery pack according to an embodiment of the present invention.
Figure 2:
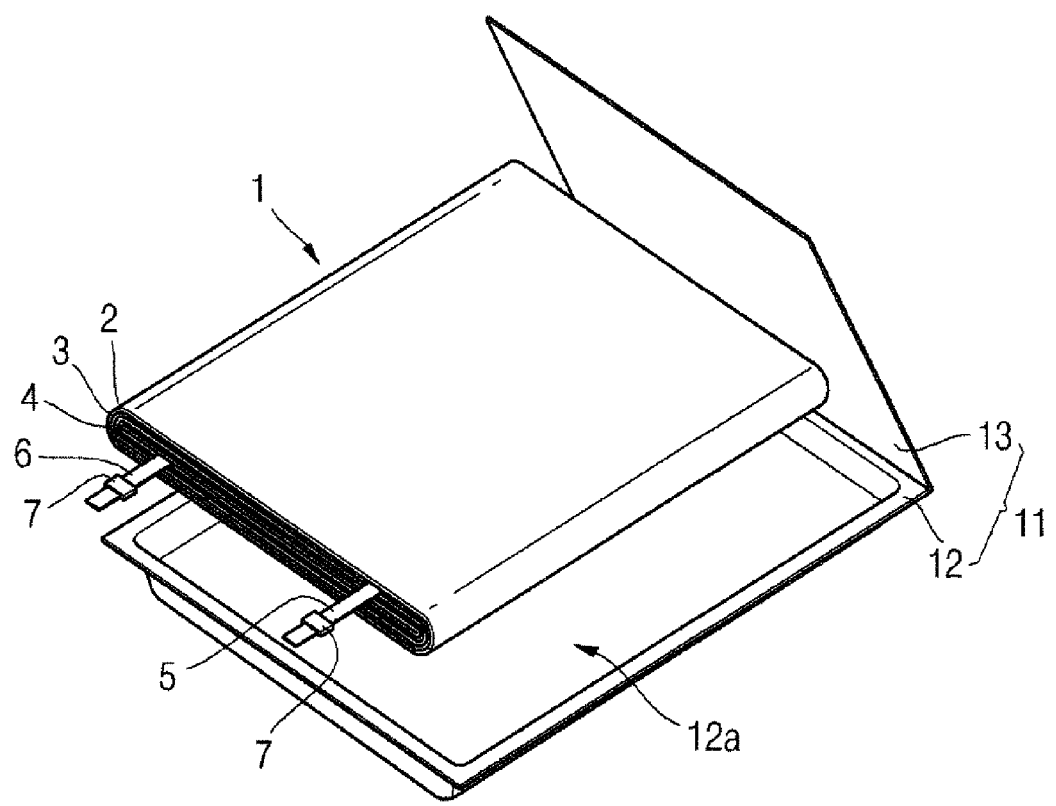
FIG. 2 is an exploded perspective view of a polymer cell in the battery pack shown in FIG. 1.

FIG. 1 is a perspective view of a completed battery pack according to an embodiment of the present invention, and FIG. 2 is an exploded perspective view of a polymer cell in the battery pack shown in FIG. 1.

Referring to FIG. 1, the battery pack 100 according to the embodiment of the present invention includes a bare cell 10, and a cover frame 20 surrounding top, bottom and opposing side surfaces of the bare cell 10.

Referring to FIG. 2, the bare cell 10 includes an electrode assembly 1 and a case 11 housing the electrode assembly 10. The electrode assembly 1 includes a positive electrode plate 2 having a positive electrode active material coated on its both surfaces, a negative electrode plate 4 having a negative electrode active material coated on its both surfaces, and a separator 3 interposed between the positive electrode plate 2 and the negative electrode plate 4. In addition, a positive electrode tab 5 protruding a predetermined length and functioning as a positive electrode is attached to the positive electrode plate 2. Further, a negative electrode tab 6 protruding a predetermined length and functioning as a negative electrode is attached to the negative electrode plate 4. An insulation tape 7 may further be provided in the positive electrode tab 5 and the negative electrode tab 6 to insulate each of the positive electrode tab 5 and the negative electrode tab 6 from the case 11, respectively. The positive electrode tab 5 and the negative electrode tab 6 are drawn out to the outside through one side surface of the case 11 and are electrically connected to a protection circuit module (PCM) (not shown), respectively.

The case 11 is folded at the center of a layer forming the case 11 to then be divided into a lower case 12 and an upper case 13. The lower case 12 has a receiving section 12a formed by a pressing process to receive the electrode assembly 1. The electrode assembly 1 is received in the receiving section 12a and the lower case 12 is covered by the upper case 13, followed by thermally welding edges of the receiving section 12a, thereby completing the bare cell 10.

In the present invention, a surface of the bare cell 10 from which the electrode tabs 5 and 6 extend is referred to as a top surface, and a surface opposite to and facing the top surface is referred to as a bottom surface. In addition, a surface connecting one short side of the top surface to one short side of the bottom surface is referred to as a first short side surface, and a surface connecting the other short side of the top surface to the other short side of the bottom surface is referred to as a second short side surface. Further, a surface connecting one long side of the top surface to one long side of the bottom surface is referred to as a first long side surface, and a surface, formed by upper case 13, connecting the other long side of the top surface to the other long side of the bottom surface is referred to as a second long side surface.

Figure 3A:
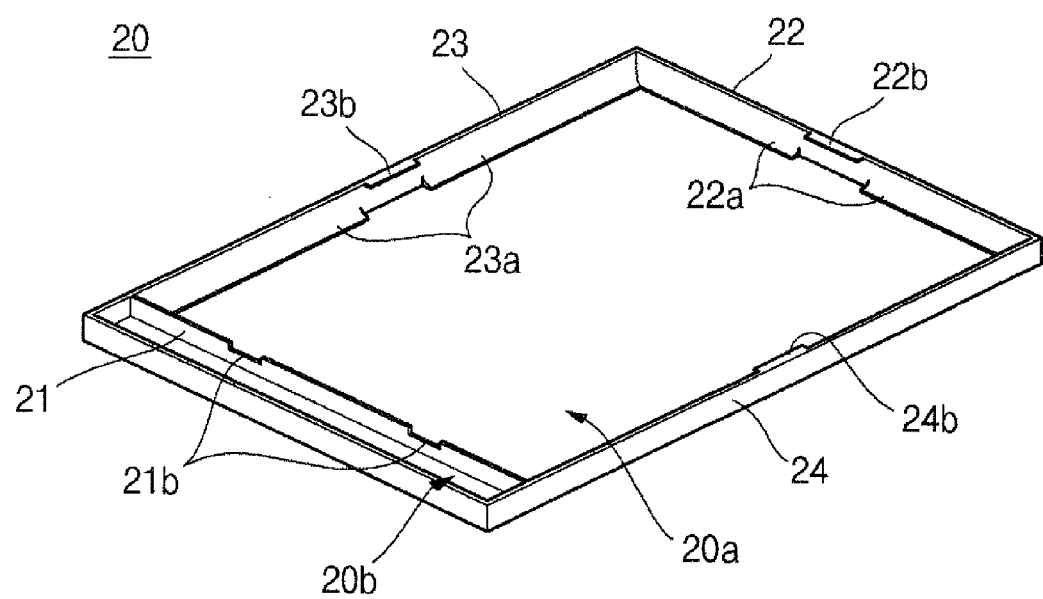
FIG. 3A is a perspective view of a cover frame in the battery pack shown in FIG. 1.
Figure 3B:
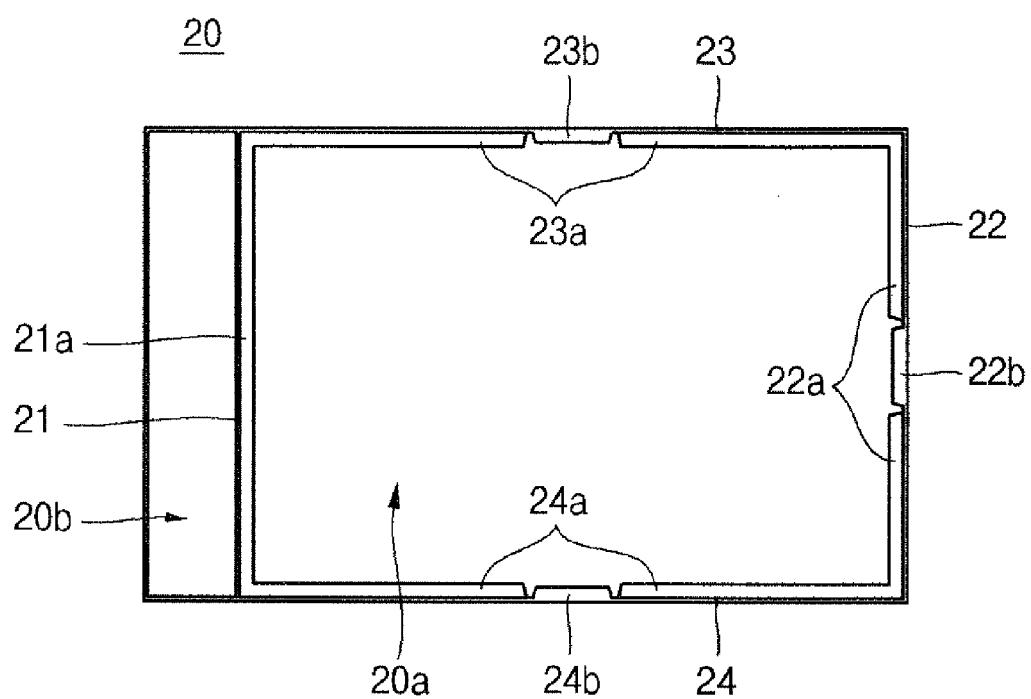
FIG. 3B is a plan view of the cover frame shown in FIG. 3A.

FIG. 3A is a perspective view of a cover frame in the battery pack shown in FIG. 1, and FIG. 3B is a plan view of the cover frame shown in FIG. 3A.

Referring to FIGS. 3A and 3B, the cover frame 20 includes a first frame 21, a second frame 22, a third frame 23 and a fourth frame 24 surrounding the top surface (from which the electrode tabs 5 and 6 extend), bottom surface and opposing short side surfaces of the bare cell 10. Thus, the bare cell 10 is received in a cell receiving section 20a surrounded by the first to fourth frames 21, 22, 23 and 24. The cover frame 20 may further include a PCM (protection circuit module) receiving section 20b adjacent to and separated from the cell receiving section 20a by first frame 21. In addition, the cover frame 20 may be made of an elastic material such as rubber. However, the present invention does not limit the material of the cover frame 20 to rubber, and any elastic material that is somewhat deformable can be used.

The first frame 21 includes a first support portion 21a (FIG. 3B) formed at a thicknesswise bottom end (edge) and tab receiving grooves 21b (FIG. 3A) formed at a thicknesswise top end (edge).

The first support portion 21a is formed along at least a lengthwise a portion of the first frame 21 and extends from the thicknesswise bottom end of the first frame 21 toward the inside of the cover frame 20, that is, toward the cell receiving section 20a. Thus, the first support portion 21a supports the first long side surface of the bare cell 10 accommodated inside the cell receiving section 20a of the cover frame 20. In addition, in order to increase the supporting capacity of the first support portion 21a, the first support portion 21a is preferably formed from a lengthwise end of the first frame 21 to the other lengthwise end of the first frame 21.

The tab receiving grooves 21b are formed at locations corresponding to the positive electrode tab 5 and the negative electrode tab 6 of the bare cell 10 accommodated in the cell receiving section 20a. Therefore, the positive electrode tab 5 and the negative electrode tab 6 are drawn out toward the PCM receiving section 20b through the tab receiving grooves 21b, respectively, for electrical connection to the PCM (not shown) accommodated in the PCM receiving section 20b.

The second frame 22 includes a second support portion 22a formed at a thicknesswise bottom end and a first rib 22b formed at a thicknesswise top end.

The second support portion 22a is formed along at least a lengthwise portion of the second frame 22 and extends from the thicknesswise bottom end of the second frame 22 toward the cell receiving section 20a. Thus, the second support portion 22a supports the first long side surface of the bare cell 10 accommodated inside the cell receiving section 20a of the cover frame 20. In addition, in order to increase the supporting capacity of the second support portion 22a, the second support portion 22a is preferably formed from a lengthwise end of the second frame 22 to the other lengthwise end of the second frame 22.

The first rib 22b is formed along at least a lengthwise portion of the second frame 22 and extends from the thicknesswise top end of the second frame 22 toward the cell receiving section 20a. Thus, the first rib 22b supports the second long side surface of the bare cell 10 accommodated inside the cell receiving section 20a of the cover frame 20. The configuration in which the first rib 22b is formed in the second frame 22 provides for a superb fixing effect particularly in a wide, thin battery pack having an increased long side surface of the bare cell 10. In addition, the first rib 22b is preferably formed at a central portion of the top end of the second frame 22, except that the second support portion 22a may not be formed at a region corresponding to a region where a first rib 22b, which will later be described, is formed. The second support portion 22a is for the purpose of stably fixing the bare cell 10 accommodated in the cell receiving section 20a of the cover frame 20.

As shown in FIG. 3B, when the cover frame 20 is viewed downwardly from the top, the second support portion 22a and the first rib 22b are preferably formed so as not to overlap each other. That is to say, the second support portion 22a is preferably not formed in an area of the lengthwise region of the second frame 22 corresponding to a region where the first rib 22b is formed. This simplifies a molding structure, thereby facilitating fabrication of the cover frame 20 by injection molding and improving the yield of the battery pack 100.

The third frame 23 includes a third support portion 23a formed at a thicknesswise bottom end and a second rib 23b formed at a thicknesswise top end.

The third support portion 23a is formed along at least a lengthwise portion of the third frame 23 and extends from the thicknesswise bottom end of the third frame 23 toward the cell receiving section 20a. Thus, the third support portion 23a supports the first long side surface of the bare cell 10 accommodated inside the cell receiving section 20a of the cover frame 20. In addition, in order to increase the supporting capacity of the third support portion 23a, the third support portion 23a is preferably formed from a lengthwise end of the third frame 23 to the other lengthwise end of the third frame 23, except that the third support portion 23a may not be formed at a region corresponding to a region where a second rib 23b, which will later be described, is formed. In addition, one end of the third support portion 23a is preferably connected to one end of the first support portion 21a and the other end the third support portion 23a is preferably connected to one end of the second support portion 22a, which is for the purpose of increasing the supporting capacity of the support portions 21a, 22a and 23a.

The second rib 23b is formed along at least a lengthwise portion of the third frame 23 and extends from the thicknesswise top end of the third frame 23 toward the cell receiving section 20a. Thus, the second rib 23b supports the second long side surface of the bare cell 10 accommodated inside the cell receiving section 20a of the cover frame 20. In addition, the second rib 23b is preferably formed at a central portion of the top end of the third frame 23. This is for the purpose of stably fixing the bare cell 10 accommodated in the cell receiving section 20a of the cover frame 20 while facilitating insertion of the bare cell 10 into the cell receiving section 20a of the cover frame 20.

As shown in FIG. 3B, when the cover frame 20 is viewed downwardly from the top, the third support portion 23a and the second rib 23b are preferably formed so as not to overlap each other. That is to say, the third support portion 23a may not be formed in an area of the lengthwise region of the third frame 23 corresponding to a region where the second rib 23b is formed. Thus, fabrication of the cover frame 20 by injection molding is facilitated, thereby improving the yield of the battery pack 100.

The second rib 23b is preferably shorter than the third support portion 23a in a lengthwise direction of the third frame 23. This is for the purpose of facilitating insertion of the bare cell 10 into the cell receiving section 20a from the top portion of the cover frame 20. That is to say, in order to insert the bare cell 10 into the cell receiving section 20a, it is necessary for the second rib 23b to elastically deform upwardly. Therefore, if the second rib 23b is formed to be longer than the third support portion 23a, it is not easy to insert the bare cell 10 into a region between the second rib 23b and the third support portion 23a.

The fourth frame 24 includes a fourth support portion 24a formed at a thicknesswise bottom end and a third rib 24b formed at a thicknesswise top end.

The fourth support portion 24a is formed along at least a lengthwise portion of the fourth frame 24 and extends from the thicknesswise bottom end of the fourth frame 24 toward the cell receiving section 20a. Thus, the fourth support portion 24a supports the first long side surface of the bare cell 10 accommodated inside the cell receiving section 20a of the cover frame 20. In addition, in order to increase the supporting capacity of the fourth support portion 24a, the fourth support portion 24a is preferably formed from a lengthwise end of the fourth frame 24 to the other lengthwise end of the fourth frame 24, except that the fourth support portion 24a may not be formed at a region corresponding to a region where a third rib 24b, which will later be described, is formed. In addition, one end of the fourth support portion 24a is preferably connected to one end of the first support portion 21a and the other end the fourth support portion 24a is preferably connected to one end of the second support portion 22a, which is for the purpose of increasing the supporting capacity of the support portions 21a, 22a and 24a.

The third rib 24b is formed along at least a lengthwise portion of the fourth frame 24 and extends from the thicknesswise top end of the fourth frame 24 toward the cell receiving section 20a. Thus, the third rib 24b supports the second long side surface of the bare cell 10 accommodated inside the cell receiving section 20a of the cover frame 20. In addition, the second rib 24b is preferably formed at a central portion of the fourth frame 24. This is for the purpose of stably fixing the bare cell 10 accommodated in the cell receiving section 20a of the cover frame 20 while facilitating insertion of the bare cell 10 into the cell receiving section 20a of the cover frame 20.

As shown in FIG. 3B, when the cover frame 20 is viewed downwardly from the top, the fourth support portion 24a and the third rib 24b are preferably formed so as not to overlap each other. That is to say, the fourth support portion 24a is preferably not formed in an area of the lengthwise region of the fourth frame 24 corresponding to a region where the third rib 24b is formed. This facilitates fabrication of the cover frame 20 by injection molding, thereby improving the yield of the battery pack 100.

The third rib 24b is preferably shorter than the fourth support portion 24a in a lengthwise direction of the fourth frame 24. This is for the purpose of facilitating insertion of the bare cell 10 into the cell receiving section 20a from the top portion of the cover frame 20. That is to say, in order to insert the bare cell 10 into the cell receiving section 20a, it is necessary for the third rib 24b to elastically deform upwardly. Therefore, if the third rib 24b is formed to be longer than the fourth support portion 24a, it is not easy to insert the bare cell 10 into a region between the third rib 24b and the fourth support portion 24a.

As described above, the ribs, 22b, 23b and 24b are centrally located along second, third and fourth frames 22, 23 and 24, and each support section 22a, 23a and 24a includes a gap therein formed at a central region of second, third and fourth frames 22, 23 and 24 corresponding to a region where each the ribs 22b, 23b and 24b are formed.

Figure 4A:
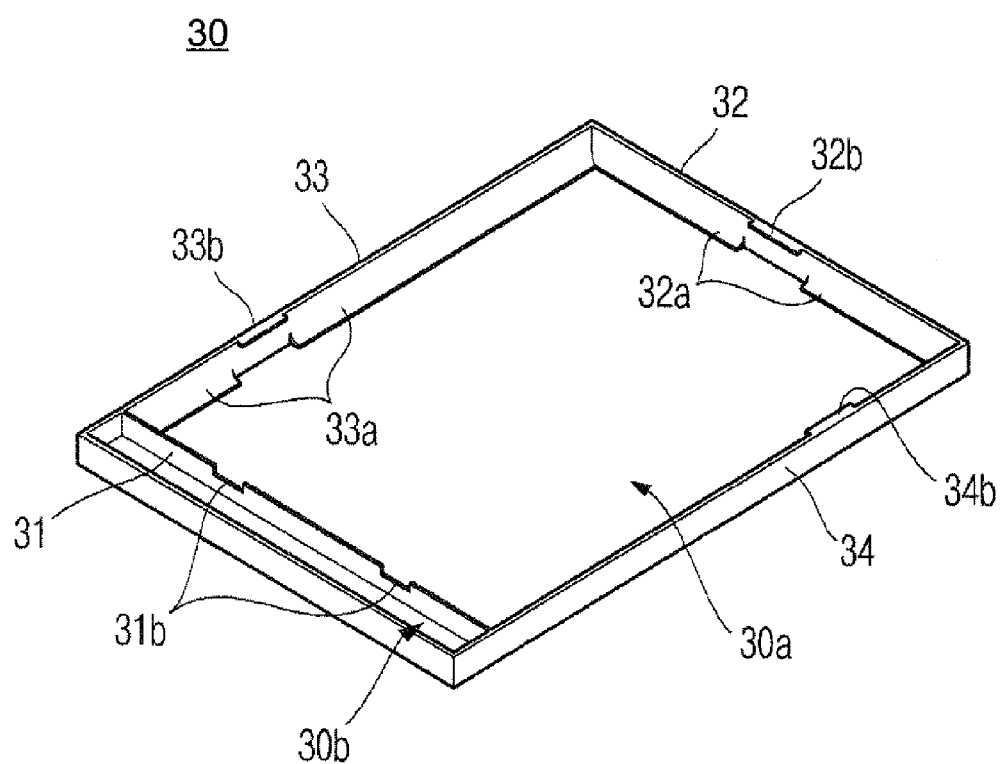
FIG. 4A is a perspective view of a cover frame in a battery pack according to another embodiment of the present invention.

Next, a cover frame in a battery pack according to another embodiment of the present invention will be described with reference to FIGS. 4A to 4C. FIG. 4A is a perspective view of a cover frame in a battery pack according to another embodiment of the present invention, and FIGS. 4B and 4C are alternative plan views of the cover frame shown in FIG. 4A.

Figure 4B:
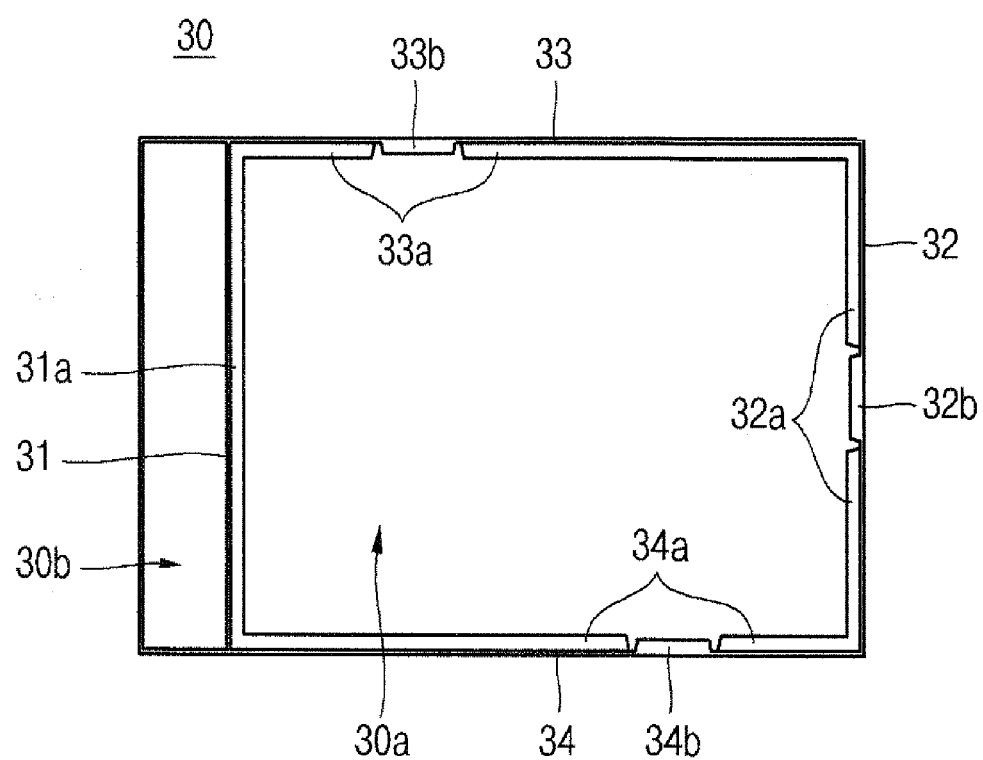
FIGS. 4B and 4C are alternative plan views of the cover frame shown in FIG. 4A.
Figure 4C:
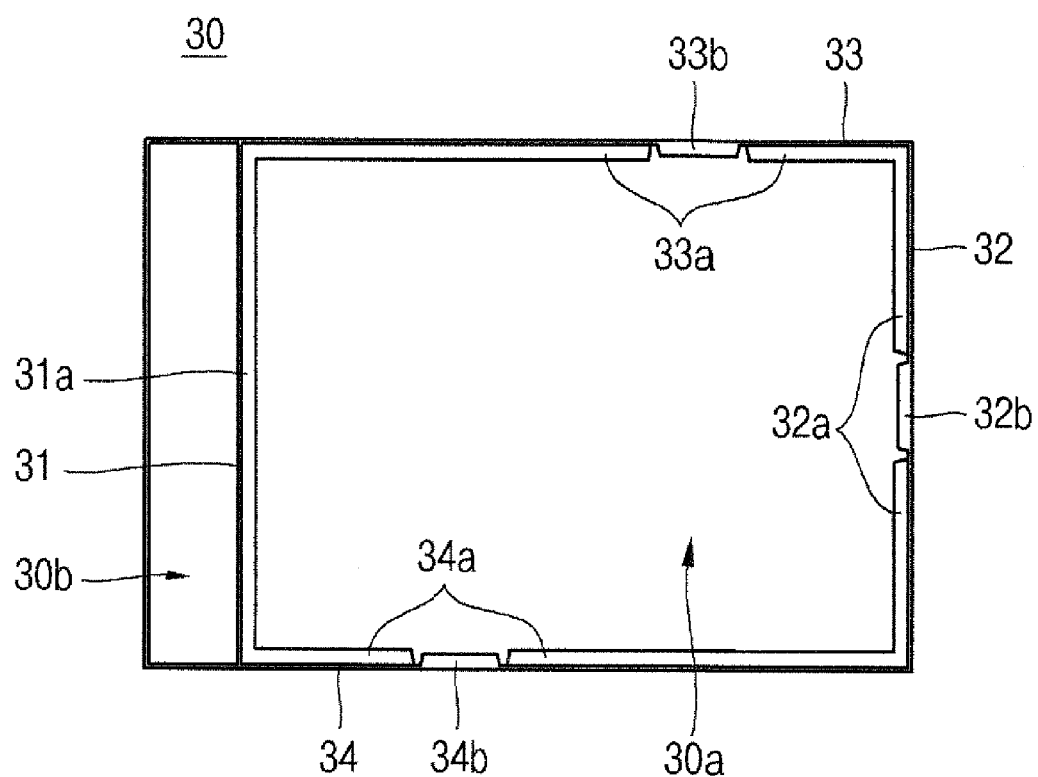

Referring to FIGS. 4A and 4B, the cover frame 30 of the battery pack according to the embodiment of the present invention includes a first frame 31, a second frame 32 a third frame 33 and a fourth frame 34 surrounding the top surface, the bottom surface and opposing side surfaces of the bare cell 10. Thus, the bare cell 10 is received in a cell receiving section 30a surrounded by the first to fourth frames 31, 32, 33 and 34. The cover frame 30 may further include a PCM receiving section 30b opposite to, and separated from, the cell receiving section 30a by the first frame 31.

The first frame 31 includes a first support portion 31a formed at a thicknesswise bottom end (edge) and tab receiving grooves 31b formed at a thicknesswise top end (edge).

The second frame 32 includes a second support portion 32a formed at a thicknesswise bottom end and a first rib 32b formed at a thicknesswise top end.

The third frame 33 includes a third support portion 33a formed at a thicknesswise bottom end and a second rib 33b formed at a thicknesswise top end.

The fourth frame 34 includes a fourth support portion 34a formed at a thicknesswise bottom end and a third rib 34b formed at a thicknesswise top end.

The cover frame 30 of the battery pack according to the embodiment of the present invention is substantially the same as the cover frame 20 of the battery pack 100, except for locations where the second rib 33b and the third rib 34b are formed, and corresponding where regions of the third support portion 33a and the fourth support portion 34a are not formed. Therefore, the cover frame 30 of the battery pack according to the embodiment of the present invention will be described with regard to the third support portion 33a, the second rib 33b, the fourth support portion 34a and the third rib 34b, and repeated explanations of the other components will not be given.

The second rib 33b may be formed at a location closer to the first frame 31 from a central portion of the third frame 33. In this case, the third rib 34b may be formed at a location closer to the second frame 32 from a central portion of the fourth frame 34. As described above, the third support portion 33a and the fourth support portion 34a may not be formed at corresponding locations where the second rib 33b and the third rib 34b are formed. That is to say, when the cover frame 30 is viewed downwardly from the top, the third support portion 33a and the second rib 33b are preferably formed so as not to overlap each other, and the fourth support portion 34a and the third rib 3bb are preferably formed so as not to overlap each other.

In addition, referring to FIG. 4C, the second rib 33b may be formed at a location closer to the second frame 32 from a central portion of the third frame 33. In this case, the third rib 34b may be formed at a location closer to the first frame 31 from a central portion of the fourth frame 34. As described above, the third support portion 33a and the fourth support portion 34a may not be formed at corresponding locations where the second rib 33b and the third rib 34b are formed. That is to say, when the cover frame 30 is viewed downwardly from the top, the third support portion 33a and the second rib 33b are preferably formed so as not to overlap each other, and the fourth support portion 34a and the third rib 3bb are preferably formed so as not to overlap each other.

As described above, when the second rib 33b and the third rib 34b are offset from the central portion of third and fourth frames 33 and 34, the bare cell 10 can be more easily inserted into the cover case 30, and each support section 32a, 33a and 34a includes a gap therein formed at a region corresponding to a region where each the ribs 32b, 33b and 34b are formed.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A battery pack, comprising:
   a bare cell having a case forming the bare cell, and a positive electrode tab and a negative electrode tab extending from a top surface of the case; and
   a cover frame having a cell receiving section formed to surround the top surface, a bottom surface and opposing side surfaces of the case, the cover frame comprising:
      first, second, third and fourth frame parts, each having a support section formed to protrude into the cell receiving section from a first edge thereof, the support section supporting a lower portion of the case;
      at least one rib formed to protrude toward the cell receiving section from a second edge of one of the second, third and fourth frame parts, the rib being substantially shorter than the one of the second, third and fourth frame parts, wherein the rib supports an upper portion of the case; and
      the first frame part having a pair of tab receiving grooves in which respective ones of the positive electrode tab and the negative electrode tab are received and supported, the tab receiving grooves being disposed adjacent to the positive electrode tab and the negative electrode tab, respectively.

2. The battery pack of claim 1, wherein each of the second, third and fourth frame parts comprise a rib.

3. The battery pack of claim 2, wherein each support section of the second, third and fourth frame parts includes a gap therein formed at a region corresponding to a region where each of the ribs are formed.

4. The battery pack of claim 3, wherein the ribs are centrally located.

5. The battery pack of claim 3, wherein the ribs of the third and fourth frame parts are offset from a central portion of the third and fourth frame parts, and the rib of the second frame part is centrally located.

6. The battery pack of claim 5, wherein the ribs of the third and fourth frame parts are each offset a predetermine distance in opposite directions from the central portion of the third and fourth frame parts.

7. The battery pack of claim 6, wherein the cover frame is made of an elastic material.

8. A battery pack, comprising:
   a bare cell having a case forming the bare cell, and a positive electrode tab and a negative electrode tab extending from a top surface of the case; and
   a cover frame having a cell receiving section formed to surround the top surface, a bottom surface and opposing side surfaces of the case forming the bare cell, the cover frame comprising:
      first, second, third and fourth frame parts, each having a support section formed to protrude into the cell receiving section from a first edge thereof, the support section supporting a lower portion of the case; and
      a rib formed to protrude toward the cell receiving section from a second edge of each of the second, third and fourth frame parts, each rib being substantially shorter than the second, third and fourth frame parts, wherein each rib supports an upper portion of the case; and
      the first frame part comprising a pair of tab receiving grooves disposed adjacent to the positive electrode tab and the negative electrode tab, respectively, the tab receiving grooves receiving and supporting respective ones of the positive electrode tab and the negative electrode tab.

9. The battery pack of claim 8, wherein the cover frame includes a protective circuit module receiving section separated from the cell receiving section by the first frame part.

10. The battery pack of claim 8, wherein each support section of the second, third and fourth frame parts includes a gap therein formed at a region corresponding to a region where each of the ribs are formed.

11. The battery pack of claim 10, wherein the ribs are centrally located.

12. The battery pack of claim 10, wherein the ribs of the third and fourth frame parts are offset from a respective central portion of the third and fourth frame parts, and the rib of the second frame part is centrally located.

13. The battery pack of claim 12, wherein the ribs of the third and fourth frame parts are each offset a predetermine distance in opposite directions from the central portion of the third and fourth frame parts.

14. The battery pack of claim 13, wherein the cover frame is made of an elastic material.

* * * * *